(12) United States Patent
Deng et al.

(10) Patent No.: US 9,443,146 B2
(45) Date of Patent: Sep. 13, 2016

(54) PHOTO DIARY

(71) Applicant: Multimedia Image Solution Limited, Dublin (IE)

(72) Inventors: Hui Deng, San Ramon, CA (US); Jin Wang, Hangzhou (CN); Shuaibin Chen, Hangzhou (CN); Lianbo Xu, Hangzhou (CN); Chengping Yang, Jiangsu (CN); Kaixuan Mao, Dublin, CA (US)

(73) Assignee: Multimedia Image Solution Limited, Dublin (IE)

( * ) Notice: Subject to any disclaimer, the term of this patent is extended or adjusted under 35 U.S.C. 154(b) by 0 days.

(21) Appl. No.: 14/569,778

(22) Filed: Dec. 14, 2014

(65) Prior Publication Data

US 2016/0110608 A1    Apr. 21, 2016

(30) Foreign Application Priority Data

Oct. 20, 2014  (CN) .......................... 2014 1 0559301

(51) Int. Cl.
*G06K 9/00*  (2006.01)
*G06K 9/62*  (2006.01)
*G06T 11/60*  (2006.01)

(52) U.S. Cl.
CPC ....... *G06K 9/00744* (2013.01); *G06K 9/00288* (2013.01); *G06K 9/00718* (2013.01); *G06K 9/6215* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 8,140,605 B2* | 3/2012 | Patton, Jr. ............... | G06F 15/16 708/112 |
| 2006/0050964 A1* | 3/2006 | Sirivara .................. | G06F 21/10 382/190 |
| 2009/0037477 A1* | 2/2009 | Choi ................. | G06F 17/30259 |
| 2010/0029294 A1* | 2/2010 | Matsuoka ......... | H04M 1/72566 455/456.1 |
| 2010/0149212 A1* | 6/2010 | Fukuya ............. | G06F 17/30241 345/629 |
| 2010/0241939 A1* | 9/2010 | Rozen-Atzmon .. | H04N 1/00132 715/202 |
| 2010/0245625 A1* | 9/2010 | Gallagher ......... | G06F 17/30265 348/231.5 |
| 2011/0270836 A1* | 11/2011 | Yang ...................... | G06Q 10/10 707/737 |
| 2013/0124973 A1* | 5/2013 | Piccionelli .......... | G06F 17/2247 715/234 |

* cited by examiner

*Primary Examiner* — Stephen R Koziol
*Assistant Examiner* — Delomia L Gilliard
(74) *Attorney, Agent, or Firm* — Patent Law Group LLP; David C. Hsia (57) ABSTRACT

A method to create a photo diary includes creating an entry for a time period in the photo diary. Creating the entry includes selecting candidate frames from digital videos created or received in the time period. Selecting the candidate frames includes performing people and pet detection on the digital videos, extract frames with people and pets from the digital videos perform people recognition on the frames with people to identify frames with recognized persons. The method further includes sorting the candidate frames with recognized persons and pets into groups based on criteria, selecting representative frames from the groups, and presenting the representative frames in the entry.

12 Claims, 9 Drawing Sheets

PHOTO DIARY

BACKGROUND

People often take short videos with their cell phones to capture their daily activities. Many people use Internet protocol (IP) cameras to check in on their homes, children, pets or businesses, and IP camera videos are often stored at servers so they are archived and accessible from anywhere. Although these videos capture people's lives, they often linger on the cell phone or servers without being fully utilized.

BRIEF DESCRIPTION OF THE DRAWINGS

In the drawings.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on. The term "or" is used to refer to a nonexclusive such that "A or B" includes "A but not B," "B but not A," and "A and B" unless otherwise indicated.

In examples of the present disclosure, a method to create a photo diary includes creating an entry for a time period in the photo diary. Creating the entry includes selecting candidate frames from digital videos created or received in the time period. Selecting the candidate frames includes performing people and pet detection on the digital videos, extract frames with people and pets from the digital videos perform people recognition on the frames with people to identify frames with recognized persons. The method further includes sorting the candidate frames with recognized persons and pets into groups based on criteria, selecting representative frames from the groups, and presenting the representative frames in the entry.

Figure 1:
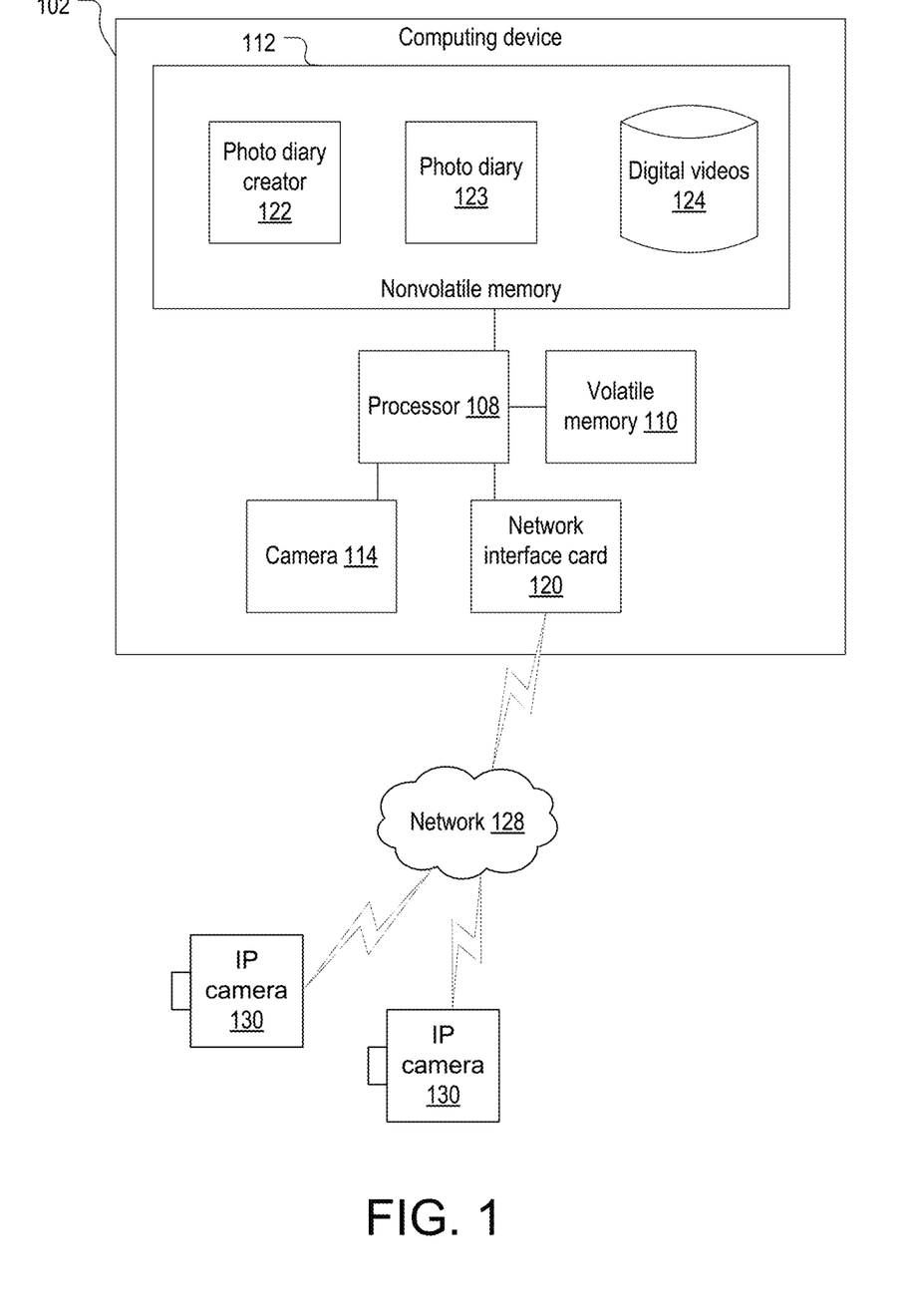
FIG. 1 is a block diagram of a computing device with a photo diary creator in examples of the present disclosure.

FIG. 1 is a block diagram of a computing device 102 including a photo diary creator 122 in examples of the present disclosure. Computing device 102 may be a desktop computer, a laptop computer, a tablet computer, a smart phone, or a server computer.

Computing device 102 includes a processor 108, a volatile memory 110, a nonvolatile memory 112, a camera 114, and a wired or wireless network interface card (NIC) 120. Nonvolatile memory 112 stores the code of photo diary creator 122, a photo diary 123, and digital videos 124. Processor 108 loads the code of photo diary creator 122 from nonvolatile memory 112 to volatile memory 110, executes the code, and stores application data in volatile memory 110. Photo diary creator 122 creates photo diary 123 from digital videos 124, which may be captured with camera 114 or received with NIC 120 over a network 128. For example, when computing device 102 is a server computer providing the photo diary service to a user, computing device 102 receives digital videos 124 from the user's IP cameras 130. IP cameras 130 may be at various known locations in a user's home or business. Photo diary 123 may include entries generated periodically from digital videos 124.

Figure 2:
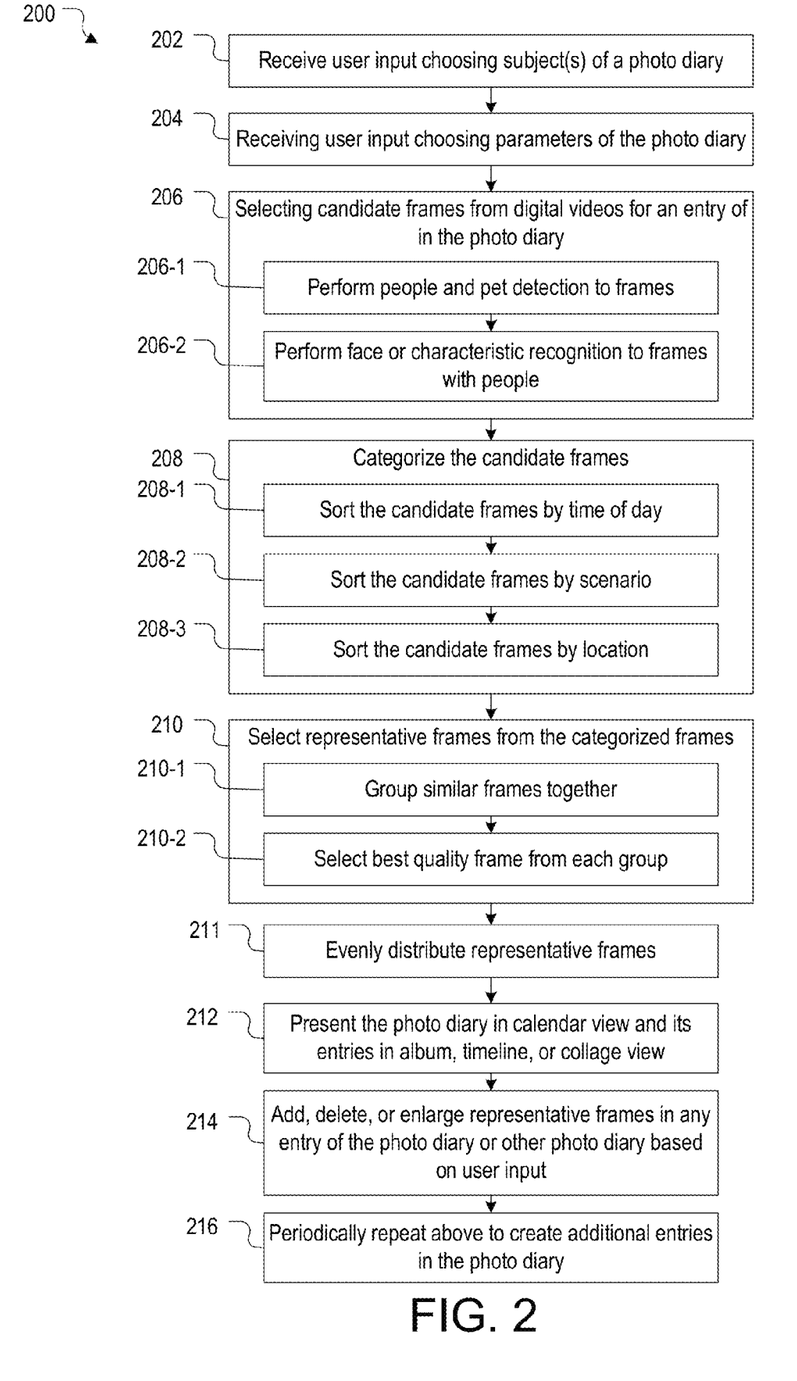
FIG. 2 is a flowchart of a method to create a photo diary in examples of the present disclosure.

FIG. 2 is a flowchart of a method 200 to create photo diary 123 (FIG. 1) in examples of the present disclosure. Method 200 may be implemented by processor 108 (FIG. 1) executing the code of photo diary creator 122 (FIG. 1). Method 200 may include one or more operations, functions, or actions illustrated by one or more blocks. Although the blocks of method 200 and other methods described herein are illustrated in sequential orders, these blocks may also be performed in parallel, or in a different order than those described herein. Also, the various blocks may be combined into fewer blocks, divided into additional blocks, or eliminated based upon the desired implementation. Method 200 may begin in block 202.

In block 202, processor 108 receives user input of a subject or subjects of a photo diary 123. The user input may be local or received over a computer network from a client device. In some examples of the present disclosure, a user may choose the subject or subjects of photo diary 123 by selecting one or more persons identifiable by a face recognition algorithm. For example, the user may wish to create a photo diary 123 on him or her. In other examples of the present disclosure, the user may choose the subject or subjects by selecting one or more human characteristics identifiable by characteristic recognition. For instance, the human characteristics may be age (e.g., kids, adults, or seniors) and gender (e.g., male or female) identifiable by age estimation and gender detection algorithms, respectively. Face recognition and characteristic recognition may be collectively referred to as people recognition. In other examples of the present disclosure, the user may choose the subject or subjects by selecting one or more pet types. For example, the pet types may be cats, dogs, birds, or horses. The user may also select a combination of the described subject. For instance, the user may wish to create a photo diary on the subject of kids with dogs and cats. In some examples of the present disclosure, processor 108 may automatically or at the behest of the user create a photo diary on unrecognized persons. Block 202 may be followed by block 204.

In block 204, processor 108 receives user input of a parameter or parameters of photo diary 123. The user input may local or received over a network from a client device. The user may choose the frequency for creating a new entry in photo diary 123. For example, the user may wish to create a new entry every day, every several days, every week, or every month. The user may choose a maximum number of frames in each entry of photo diary 123 and a maximum number of frames in photo diary 123. Alternatively processor 108 may use default values for these parameters. Block 204 may be followed by block 206.

In block 206, processor 108 selects candidate frames from digital videos 124 (FIG. 1) for an entry in photo diary 123.

The entry represents what happened to the subject or subjects of photo diary 123 for a specific span of time. For the entry, processor 108 select digital videos 124 created or received in the same span of time. Block 206 may include sub-blocks 206-1 and 206-2.

Figure 3:
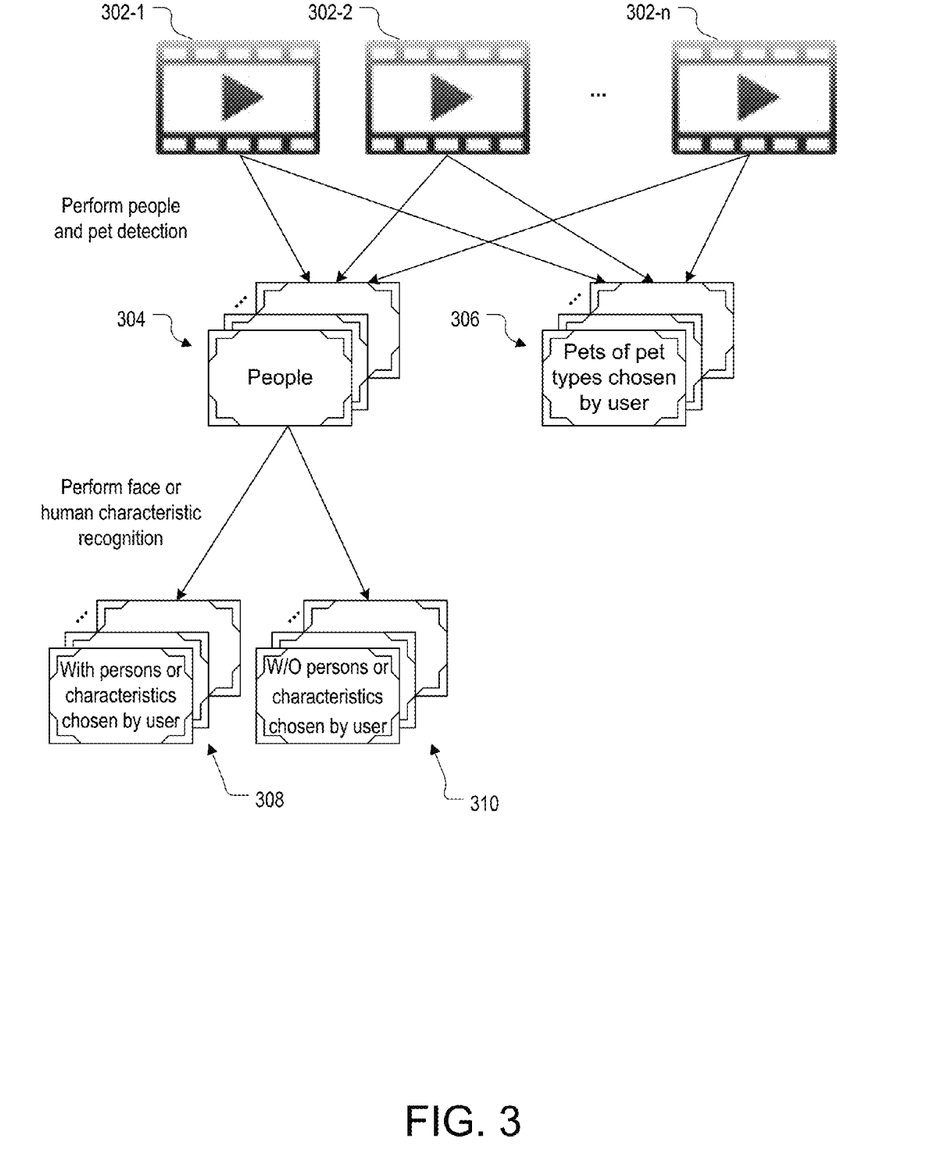
FIG. 3 illustrates selecting candidate frames from digital videos in examples of the present disclosure.

In block 206-1, processor 108 performs people and pet detection to frames in the selected digital videos 124 to extract and place frames with people into one group and frames with pet types chosen by the user into another group. This is graphically illustrated in FIG. 3 in examples of the present disclosure. In FIG. 3, processor 108 performs people and pet detection on frames of digital videos 302-1, 302-2 . . . 302-n to extract and place frames with people into a group 304 and frames with pets into a group 306. Note the frames in groups 304 and 306 may overlap as some frames may include both a person and a pet. Sub-block 206-1 may be followed by sub-block 206-2. Processor 108 tracks the pet types (e.g., cat, dog, bird, or horse) in the frames of group 306, such as recording the correspondence in a table or annotating the frames.

Referring back to FIG. 2, in sub-block 206-2, processor 108 performs face recognition or human characteristic (age and gender) recognition to extract and place frames with persons or human characteristics chosen by the user in one group and frames without the persons or the human characteristics chosen by the user in another group. This is again graphically illustrated in FIG. 3 in examples of the present disclosure. In FIG. 3, processor 108 performs face recognition or human characteristic recognition to extract and place frames with recognized persons or human characteristics chosen by the user in group 308 and frames without the persons or the human characteristics chosen by the user in group 310. Note the frames in groups 308 and 310 may overlap as some frames may include both a recognized person and a person with a recognized human characteristic. Processor 108 tracks the recognized persons or human characteristics in the frames of group 308, such as recording the correspondence in a table or annotating the frames. In some examples, the frames in group 306 or group 308 are candidate frames when the user chooses the subject of photo diary 123. In other examples, the frames in group 310 are candidate frames, such as when processor 108 automatically or at the behest of the user creates a photo diary on unrecognized persons.

Referring back to FIG. 2, sub-block 206-2 may be followed by block 208.

Figure 4:
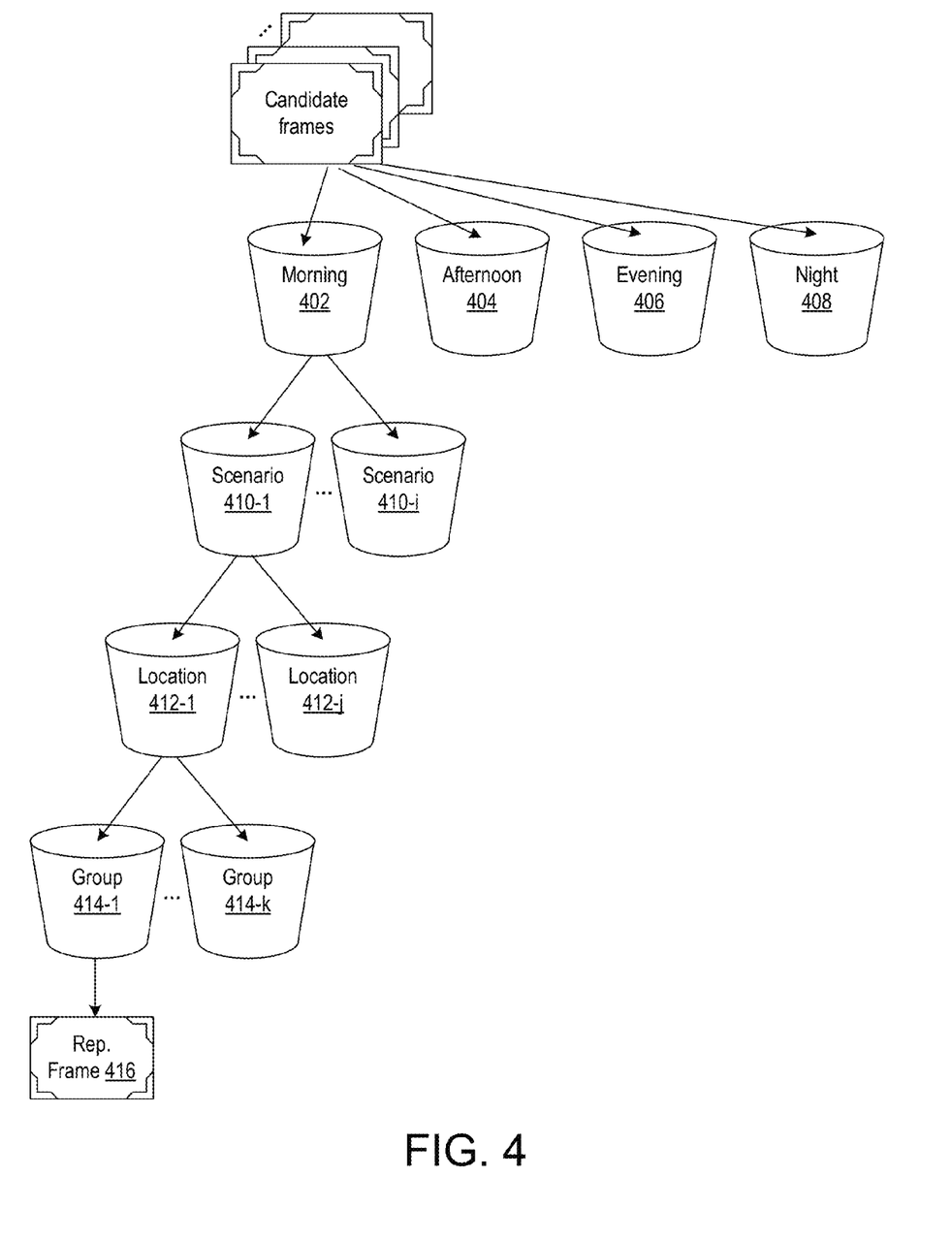
FIG. 4 illustrates categorizing the candidate frames of FIG. 3 in examples of the present disclosure.

In block 208, processor 108 categorizes the candidate frames from block 206 for each day in the entry's time period. Block 208 may include sub-blocks 208-1, 208-2, and 208-3. In sub-block 208-1, processor 108 determine the captured or received time of the candidate frames based on metadata of their source video and sorts the candidate frames by time increments. For example, if an entry is created each week, the time increments may be the days in the week. If an entry is created each day, the time increments may be morning, afternoon, evening, and night. This is graphically illustrated for an one day entry in examples of the present disclosure. In FIG. 4, processor 108 places the candidate frames into time groups, such as a morning group 402, an afternoon group 404, an evening group 406, and a night group 408. Referring back to FIG. 2, sub-block 208-1 may be followed by sub-block 208-2.

In sub-block 208-2, processor 108 determines the scenario captured in the candidate frames by scene detection and categorizes the candidate frames from each time group by scenario. This is graphically illustrated in FIG. 4 in examples of the present disclosure. For each time group, processor 108 places its candidate frames into scenario groups 410-1 to 410-i. For clarity, this is only illustrated for morning group 402. Scenarios include breakfast, lunch, dinner, leaving for work, returning from work, leaving for school, returning from school, party, or other activities. Scene detection may detect a scenario based on time and objects, including people, detected in a frame. Referring back to FIG. 2, sub-block 208-2 may be followed by sub-block 208-3.

In sub-block 208-3, processor 108 determines the location captured in the candidate frames and categories the candidate frames from each scenario group by location. This is graphically illustrated in FIG. 4 in examples of the present disclosure. For each scenario group, processor 108 places its candidate frames into location groups 412-1 to 412-j. For clarity, this is only illustrated for scenario group 410-1. Locations may include living room, kitchen, dining room, and bedrooms at a home. Processor 108 may perform location detection to analyze the candidate frames and determine the locations captured in them. The locations captured in the candidate frames may also be the locations of IP cameras 130 (FIG. 1) that captured digital videos 124 (FIG. 1), which may be provided by the user during initial setup of photo diary 122 (FIG. 1) or retrieved from a smart home system such as Apple HomeKit.

Referring back to FIG. 2, sub-block 208-3 may be followed by block 210.

In block 210, processor 108 selects representative frames from the categorized frames in block 208. Block 210 may include sub-blocks 210-1 and 210-2. In sub-block 210-1, processor 108 groups the categorized frames by content similarity. This is graphically illustrated in FIG. 4 in examples of the present disclosure. For each location group, processor 108 places its candidate frames into similarity groups 414-1 to 414-k based on content similarity. For clarity, this is only illustrated for location group 412-1. Referring back to FIG. 2, sub-block 210-1 may be followed by sub-block 210-2.

In sub-block 210-2, processor 108 selects a best frame from each similarity group based on image quality. This is graphically illustrated in FIG. 4 in examples of the present disclosure. For each similarity group, processor 108 selects a best frame 416 based on image quality. For clarity, this is only illustrated for similarity group 414-1. Image quality may be based on blurry level, noise level, exposure, lighting condition, color, face size, face position, face angle, facial expression, eyes blinking, etc.

Referring back to FIG. 2, sub-block 210-2 may be followed by block 211.

In block 211, processor 108 evenly spreads the representative frames across categories or set different priorities for different categories, based on the maximum number of frames per entry. The priorities given to for different categories may be set by user input.

Assume an entry is created each day and the maximum number of frames per entry is 40. Processor 108 then allocates 10 representative frame slots to each of the time increments (morning, afternoon, evening, and night) in a day entry. If there were actually less representative frame slots than time increments, processor 108 may allocate the representative frame slots based on priorities given to the different time increments (e.g., evening>morning>afternoon>night).

Assume under morning there are 2 scenarios, processor 108 allocates 5 representative frame slots to each scenario. If there were actually less representative frame slots than scenarios, processor 108 may allocate the representative frame slots based on priorities given to the different scenarios (e.g., party>dinner>returning from school>returning from work>breakfast>leaving for school>leaving for work>lunch).

Assume under the first scenario there are two locations, processor 108 allocates 3 representative frame slots to the first location and 2 representative frame slots to the second locations (or vice versa). If there were actually less representative frame slots than locations, processor 108 may allocate the representative frame slots based on priorities given to the different locations (kitchen>dining room>living room>bedrooms).

Assume under the first location there are 5 groups of similar frames, processor 108 allocates 3 representative frame slots 3 of the 5 groups that have the best representative frames based on one or more criteria. For example, the criteria may include image quality based on blurry level, noise level, exposure, lighting condition, color, face size, face position, face angle, facial expression, eyes blinking, etc.

Block 211 may be followed by block 212.

Figure 5:
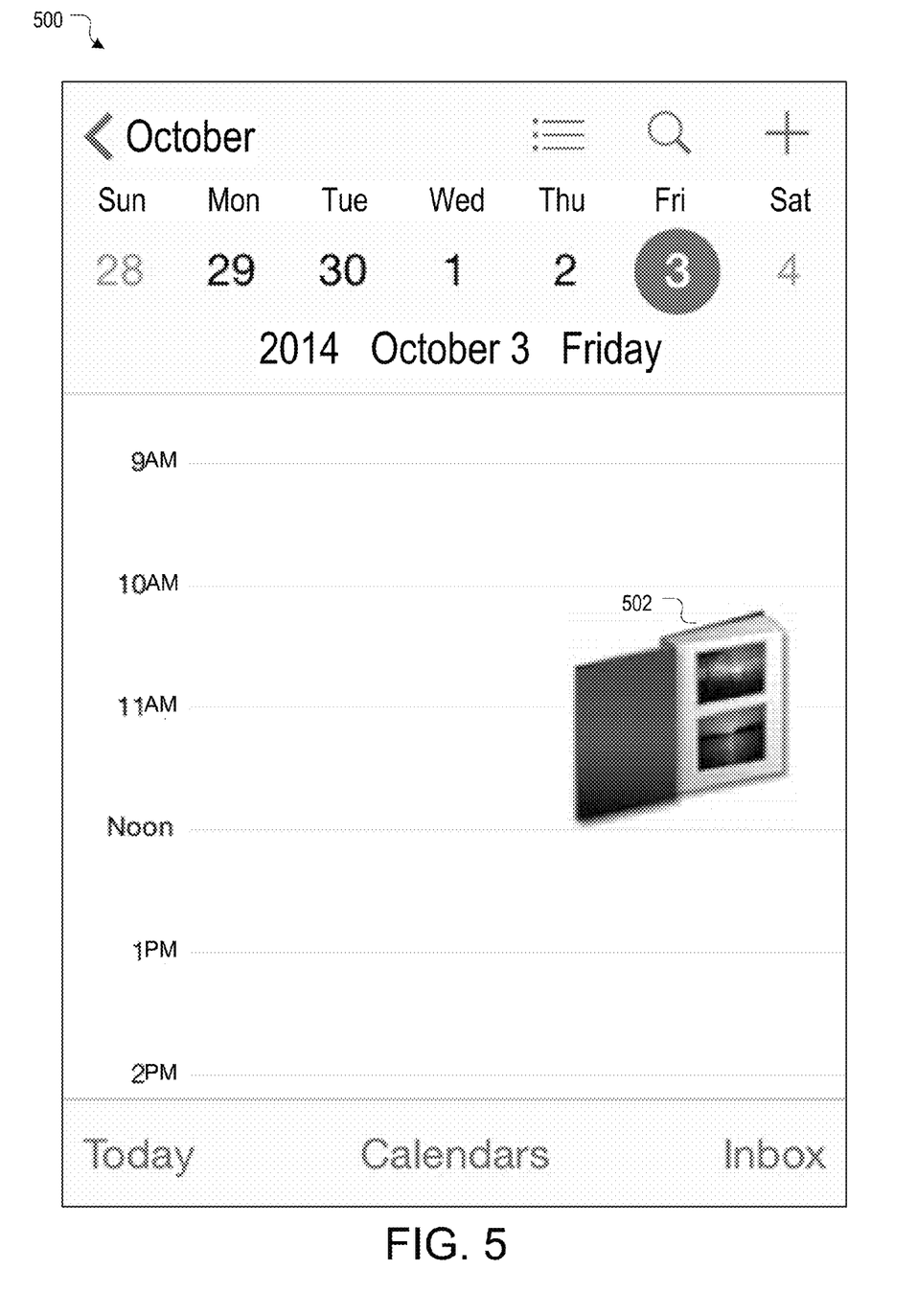
FIG. 5 illustrates a calendar view of a photo diary in examples of the present disclosure.

In block 212, processor 108 presents a calendar view with a photo diary icon locally or over a network to a client device. FIG. 5 illustrates a calendar view 500 with a photo diary icon 502 in examples of the present disclosure. Photo diary icon 502 appears on a day, week, or month of the calendar to indicate an entry of photo diary 123 has been generated for the same time period. The user may click or otherwise select photo diary icon 502 to view the corresponding entry in photo diary 123. Calendar view 500 may be integrated with a calendar program on computing device 102 (FIG. 1) or be an interface of photo diary creator 122.

Figure 6:
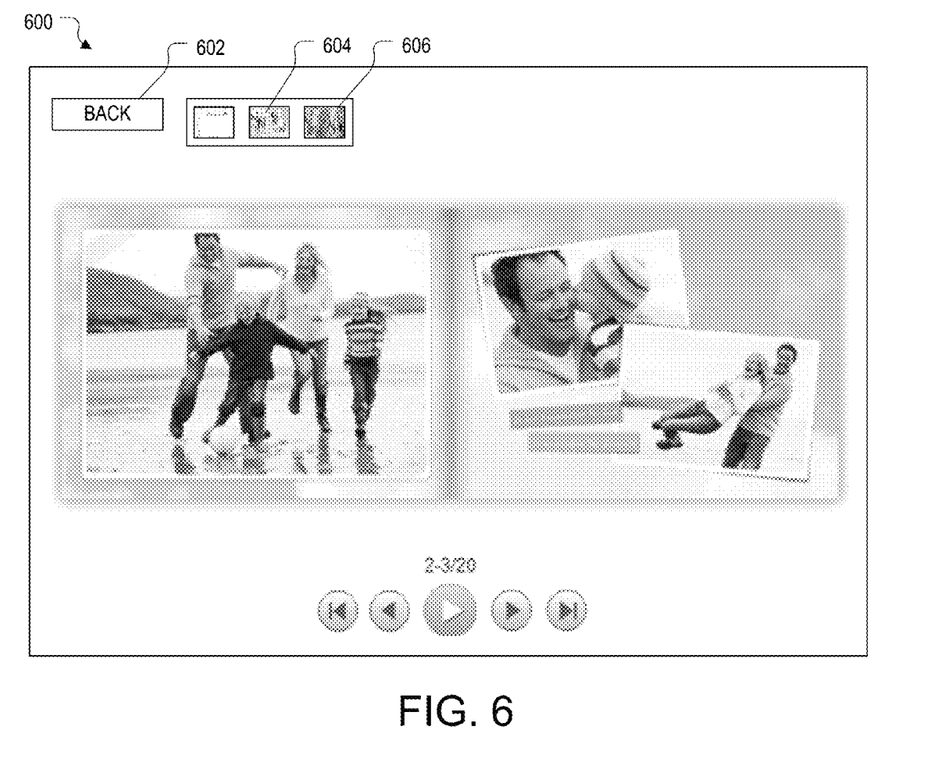
FIG. 6 illustrates an entry of the photo diary in an album format in examples of the present disclosure.

Processor 108 presents an entry of photo diary 123 in an album view, a timeline view, or a collage view locally or over a network to a client device. FIG. 6 illustrates an album view 600 of an entry in examples of the present disclosure. Album view 600 includes a back button 602 to return to calendar view 500 (FIG. 5), a button 604 to change to a timeline view, and a button 606 to change to a collage view. Album view 600 arranges the representative figures of the entry in a photo album format where the user flips through a digital photo album to view additional representative figures. The digital photo album may be created using a template.

Figure 7:
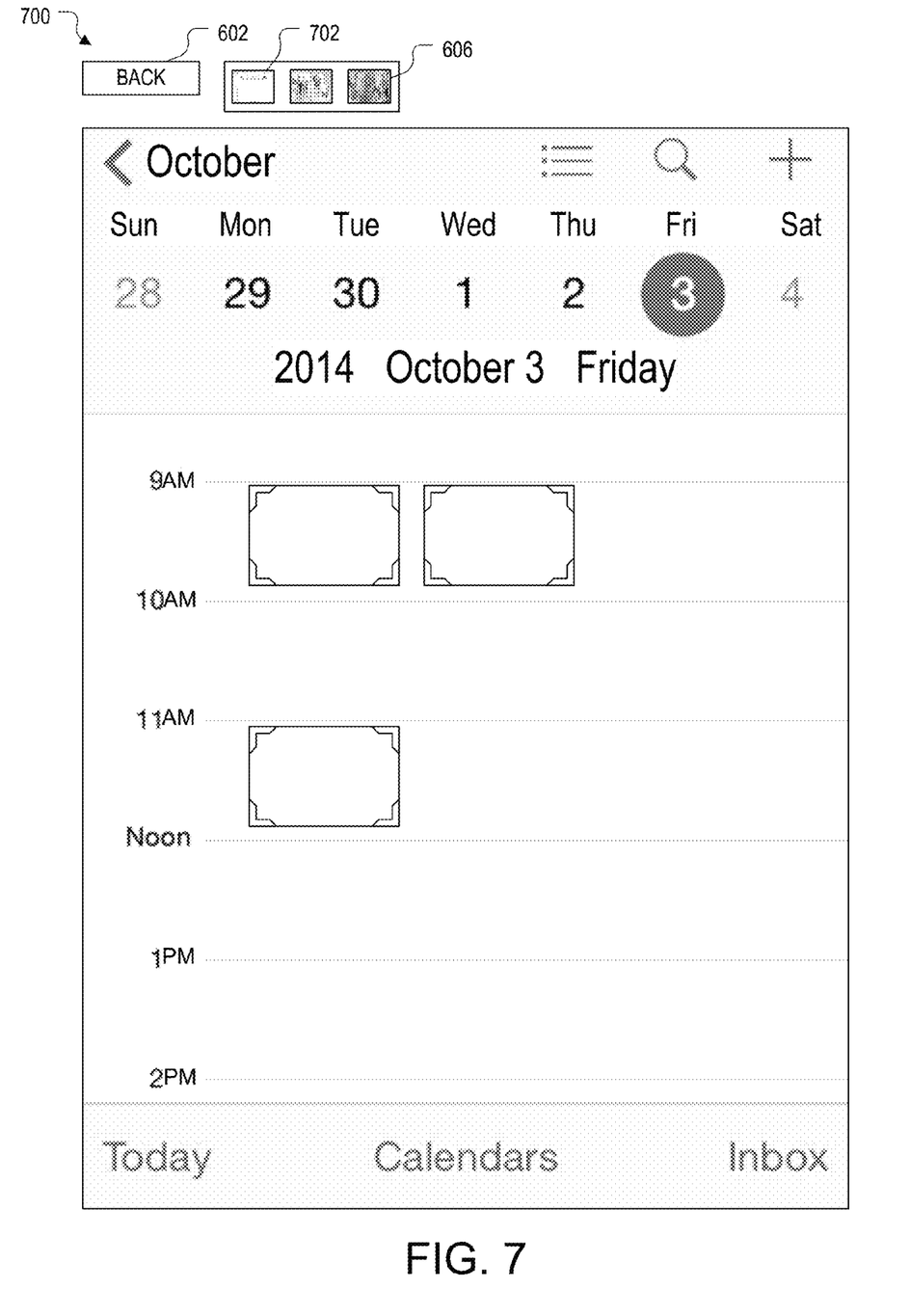
FIG. 7 illustrates an entry of the photo diary in a timeline format in examples of the present disclosure.

FIG. 7 illustrates a timeline view of an entry in examples of the present disclosure. Timeline view 700 includes back button 602 to return to calendar view 500 (FIG. 5), a button 702 to change to the album view, and button 606 to change to collage view. Timeline view 700 arranges the representative figures chronologically in a timeline format where the user can scroll through the timeline to view additional representative figures.

Figure 8:
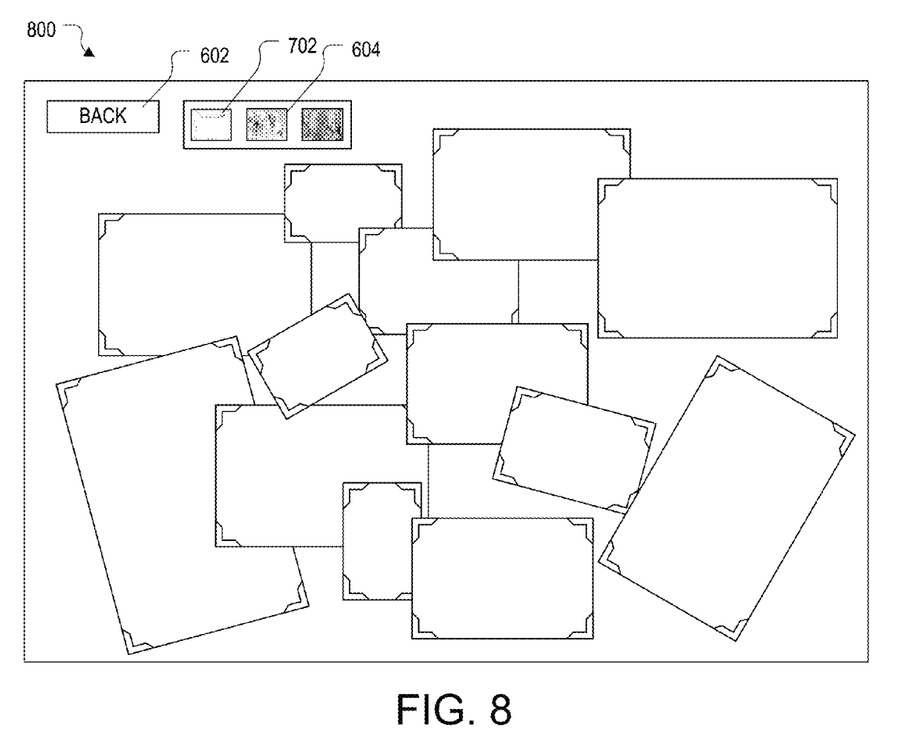
FIG. 8 illustrates an entry of the photo diary in a collage format in examples of the present disclosure.

FIG. 8 illustrates a collage view of an entry in examples of the present disclosure. Collage view 800 includes back button 602 to return to calendar view 500 (FIG. 5), button 702 to change to the album view, and button 604 to change to timeline view. Collage view 800 arranges the representative figures in a collage format.

Referring back to FIG. 2, block 212 may be followed by block 214.

In block 214, processor 108 may add or delete representative frames to any entry in photo diary 123 or another photo diary based on user input. Processor 108 may also enlarges a representative frame for viewing based on user input. Block 214 may be followed by block 216.

In block 216, processor 108 periodically repeats the above blocks to create additional entries in photo diary 123.

Figure 9:
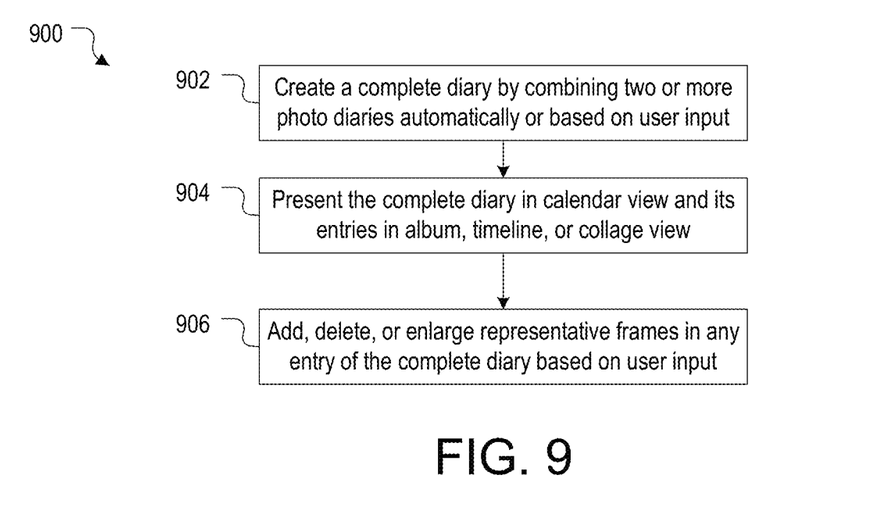
FIG. 9 is a flowchart of a method to create a complete diary by combining photo diaries in examples of the present disclosure.

FIG. 9 is a flowchart of a method 900 to create a complete diary in examples of the present disclosure. Method 200 may be implemented by processor 108 (FIG. 1) executing the code of photo diary creator 122 (FIG. 1). Method 900 may begin in block 902.

In block 902, processor 108 creates the complete diary by combining two or more photo diaries created based on user input or automatically. Combining photo diaries may be accomplished by a simple procedure. For example, if there are 3 diaries with entries for a particular day and each entry has 20 representative frames, the complete diary would have an entry of 60 representative frames. Combining photo diaries may be accomplished by an intelligent procedure. For example, representative frames from photo diaries to be combined may be evaluated and selected based on imaging technologies. Block 902 may be followed by block 904.

In block 904, processor 108 presents a calendar view with a photo diary icon for the complete diary. Block 904 is similar to block 212 (FIG. 2) previously described. Processor 108 also presents an entry of the complete diary in an album view, a timeline view, or a collage view. Block 904 may be followed by block 906.

In block 906, processor 108 may add or delete representative frames to any entry in the complete diary based on user input. Processor 108 may also enlarges a representative frame for viewing based on user input.

Various other adaptations and combinations of features of the embodiments disclosed are within the scope of the present disclosure. Numerous embodiments are encompassed by the following claims.

What is claimed is:

1. A method to create a photo diary, comprising:
    receiving user input specifying a frequency for creating entries in the photo diary, the frequency being every day, every several days, every week, or every month;
    creating an entry for a time period in the photo diary, comprising:
        selecting candidate frames from digital videos created or received in the time period, comprising:
            performing people and pet detection on the digital videos;
            extract frames with people and pets from the digital videos; and
            perform people recognition on the frames with people to identify frames with recognized persons;
        sorting the candidate frames with recognized persons and pets into groups based on criteria, wherein sorting the candidate frames with recognized persons and pets into groups based on criteria comprises sorting the frames by time increments, scenarios, and locations;
        selecting representative frames from the groups; and
        presenting the representative frames in the entry; and
    creating another entry in the photo diary for a subsequent time period.

2. The method of claim 1, further comprising detecting the scenarios and the locations from the candidate frames, wherein detecting the scenarios comprises detecting time and objects in the candidate frames and determining the scenarios based on the time and the objects detected in the candidate frames.

3. The method of claim 1, further comprising evenly spreading the representative frames across the time increments, the scenarios, and the locations, or setting different priorities for the time increments, the scenarios, and the locations.

4. The method of claim 1, further comprising sorting the candidate frames into the groups by content similarity and image quality.

5. The method of claim 4, further comprising comparing contents in the candidate frames and analyzing image qualities of the candidate frames.

6. The method of claim 1, further comprising:
    presenting a calendar view visually indicating dates with the entries in the photo diary; and
    in response to user input, presenting a corresponding entry in the photo diary.

7. The method of claim 1, wherein the entry comprises a photo album view, a timeline view, or a collage view.

8. The method of claim 7, further comprising deleting one or more of the representative frames from the entry or adding one or more new frames to the entry based on user input.

9. The method of claim 7, further comprising displaying an enlarged representative frame based on user input.

10. The method of claim 7, further using a photo album template to generate the photo album view.

11. The method of claim 1, further comprising combining the photo diary with another photo diary.

12. The method of claim 1, wherein performing people detection comprises performing face recognition or human characteristic recognition.

* * * * *

UNITED STATES PATENT AND TRADEMARK OFFICE
CERTIFICATE OF CORRECTION

PATENT NO. : 9,443,146 B2
APPLICATION NO. : 14/569778
DATED : September 13, 2016
INVENTOR(S) : Hui Deng et al.

Page 1 of 1

It is certified that error appears in the above-identified patent and that said Letters Patent is hereby corrected as shown below:

On the Title Page

Change "(73) Assignee: Multimedia Image Solution Limited" to --(73) Assignee: Hangzhou Closeli Technology Co., Ltd.--.

Signed and Sealed this
Tenth Day of April, 2018

Andrei Iancu
*Director of the United States Patent and Trademark Office*